United States Patent
Sivakumar et al.

(10) Patent No.: US 12,511,534 B2
(45) Date of Patent: Dec. 30, 2025

(54) ATTENUATION WEIGHT TRACKING IN GRAPH NEURAL NETWORKS

(71) Applicant: International Business Machines Corporation, Armonk, NY (US)

(72) Inventors: Gandhi Sivakumar, Bentleigh (AU); Anil Manohar Omanwar, Vikas Nagar (IN); Vijay Ekambaram, Chennai (IN); Smitkumar Narotambhai Marvaniya, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 815 days.

(21) Appl. No.: 17/450,134

(22) Filed: Oct. 6, 2021

(65) Prior Publication Data

US 2023/0104448 A1    Apr. 6, 2023

(51) Int. Cl.
*G06N 3/08* (2023.01)
*G06N 3/049* (2023.01)

(52) U.S. Cl.
CPC ............... *G06N 3/08* (2013.01); *G06N 3/049* (2013.01)

(58) Field of Classification Search
None
See application file for complete search history.

(56) References Cited

U.S. PATENT DOCUMENTS

| | | | |
|---|---|---|---|
| 9,366,704 B2 * | 6/2016 | Haghighat-Kashani | G01R 21/133 |
| 10,277,682 B2 | 4/2019 | Biswas et al. | |
| 10,492,721 B2 | 12/2019 | Yoon et al. | |
| 10,558,187 B2 | 2/2020 | Cella et al. | |
| 11,579,951 B2 * | 2/2023 | Kocberber | G06F 11/2263 |
| 2009/0157877 A1 * | 6/2009 | Baek | H04L 12/2803 709/225 |
| 2016/0085219 A1 * | 3/2016 | Paul | G06N 5/04 700/299 |
| 2019/0187685 A1 | 6/2019 | Cella et al. | |

(Continued)

FOREIGN PATENT DOCUMENTS

| CN | 109910890 A | 6/2019 |
|---|---|---|
| CN | 112241814 A | 1/2021 |

(Continued)

OTHER PUBLICATIONS

Lu, Yi-Ju, and Cheng-Te Li. "AGSTN: Learning attention-adjusted graph spatio-temporal networks for short-term urban sensor value forecasting." 2020 IEEE International Conference on Data Mining (ICDM). IEEE, 2020. (Year: 2020).*

(Continued)

*Primary Examiner* — Ann J Lo
(74) *Attorney, Agent, or Firm* — Yee & Associates, P.C.

(57) ABSTRACT

A computer implemented method for forecasting sensor states in a sensor network is provided. A number of processor units identifies weights and changes in the weights over time in a temporal graph of the sensor network using a temporal graph neural network trained using the temporal graph. The number of processor units determines patterns of the weights based on the weights and the changes in the weights over time. The number of processor units trains a regression machine learning model using the patterns of the weights to forecast sensor states for sensors in the sensor network.

20 Claims, 8 Drawing Sheets

(56) References Cited

U.S. PATENT DOCUMENTS

| | | | |
|---|---|---|---|
| 2019/0265366 A1 | 8/2019 | Venkatraman et al. | |
| 2021/0081717 A1* | 3/2021 | Creed | G06N 3/047 |
| 2021/0176260 A1* | 6/2021 | Pan | G06N 5/022 |
| 2021/0199850 A1* | 7/2021 | Schmude | G06N 20/10 |
| 2021/0248460 A1 | 8/2021 | Sykora et al. | |
| 2021/0264679 A1* | 8/2021 | Liu | G06F 18/214 |

FOREIGN PATENT DOCUMENTS

| | | | |
|---|---|---|---|
| CN | 112364975 A | 2/2021 | |
| CN | 112904710 A | 6/2021 | |
| CN | 113222265 A | 8/2021 | |
| KR | 20180060741 A | 6/2018 | |
| WO | 2023/056786 A1 | 4/2023 | |

OTHER PUBLICATIONS

Yu, Bing, Haoteng Yin, and Zhanxing Zhu. "Spatio-temporal graph convolutional networks: A deep learning framework for traffic forecasting." arXiv preprint arXiv:1709.04875 (2017). (Year: 2017).*

Nir Abel "Attention in RNNs", Understanding the mechanism with a detailed example, Sep. 11, 2022, 14 pages.

Santos et al. "Decrease of Power Consumption Utilizing IOT", International Journal of Innovative Technology and Exploring Engineering (IJITEE), 2019, 24 pages.

Santos et al., "IoT Power Monitoring System for Smart Environments", Sustainability, (Basel), 2019, 24 pages.

Vaswani et al., "Attention Is All You Need", NIPS, 2017, 11 pages.

Wang et al., "Time-Dependent Graphs: Definitions, Applications, and Algorithms", Data Science and Engineering, 2019, pp. 352-366.

Raj et al., "Distributed Adaptive State Estimation and Tracking Scheme for Nonlinear Systems using Active Passive Sensor Networks," 2020 American Control Conference, Denver, CO, Jul. 1-3, 2020, 6 pages.

PCT International Search Report and Written Opinion, dated Nov. 18, 2022, regarding Application No. PCT/CN2022/113465, 9 pages.

Ashiquzzaman et al., "Energy-Efficient IoT Sensor Calibration with Deep Reinforcement Learning," 10.1109/Access.2020.2992853, IEEE Access, vol. 4, 2016, 11 pages.

Du et al., "Energy-efficient sensory data gathering based on compressed sensing in IoT networks," Journal of Cloud Computing: Advances, Systems, and Applications, vol. 9, 2020, 16 pages.

Jin et al., "Deep-Learning Forecasting Method for Electric Power Load Via Attention-Based Encoder-Decoder with Bayesian Optimization," Energies, vol. 14, 2021, 19 pages.

Lu et al., "AGSTN: Learning Attention-adjusted Graph Spatio-Temporal Networks for Short-term Urban Sensor Value Forecasting," available at https://arxiv.org/abs/2101.12465, dated Jan. 2021, 6 pages.

Schultze-Kraft, "Preprocessing IoT Data: Linear Resampling, Dealing with unevenly-spaced time series data," available at https://towardsdatascience.com/preprocessing-iot-data-linear-resampling-dde750910531, accessed on Oct. 6, 2021, 6 pages.

* cited by examiner

ATTENUATION WEIGHT TRACKING IN GRAPH NEURAL NETWORKS

BACKGROUND

1. Field

The disclosure relates generally to an improved computer system for managing sensors and more specifically to managing Internet of Things sensors using a neural network.

2. Description of the Related Art

Large number of sensors such as Internet of Things (IoT) sensors can be part of an infrastructure that captures and can analyze data in real time. Many IoT devices may have power supplies such as batteries. IoT devices are often designed have a lower power requirement. Additionally, power management mechanisms can be used in IoT sensors to reduce power consumption. For example, a IoT sensor can have predefined power states such as follows: "on", "suspend", "long suspend", "sleep", and "off". In this example, "on" has the highest power consumption with power consumption becoming lower farther down the list with "off" having the lower power consumption.

The states selected for an IoT device and the transitions between states can set using rules that define times or events when state changes occur. The rules can be designed such IoT sensors are at lower power consumption states such as "long suspend" or "off" when those IoT sensors are not likely to be needed or used. For example, an IoT sensor in the form of a motion sensor for a light can be set to a lower power state, such as "sleep", during the day in a higher power state, such as "on", at night when the light is more likely to be needed or used.

SUMMARY

According to one illustrative embodiment, a computer implemented method for forecasting sensor states in a sensor network is provided. A number of processor units identifies weights and changes in the weights over time in a temporal graph of the sensor network using a temporal graph neural network trained using the temporal graph. The number of processor units determines patterns of the weights based on the weights and the changes in the weights over time. The number of processor units trains a regression machine learning model using the patterns of the weights to forecast sensor states for sensors in the sensor network. According to other illustrative embodiments, a computer system and a computer program product for forecasting sensor states are provided.

DETAILED DESCRIPTION

Figure 1:
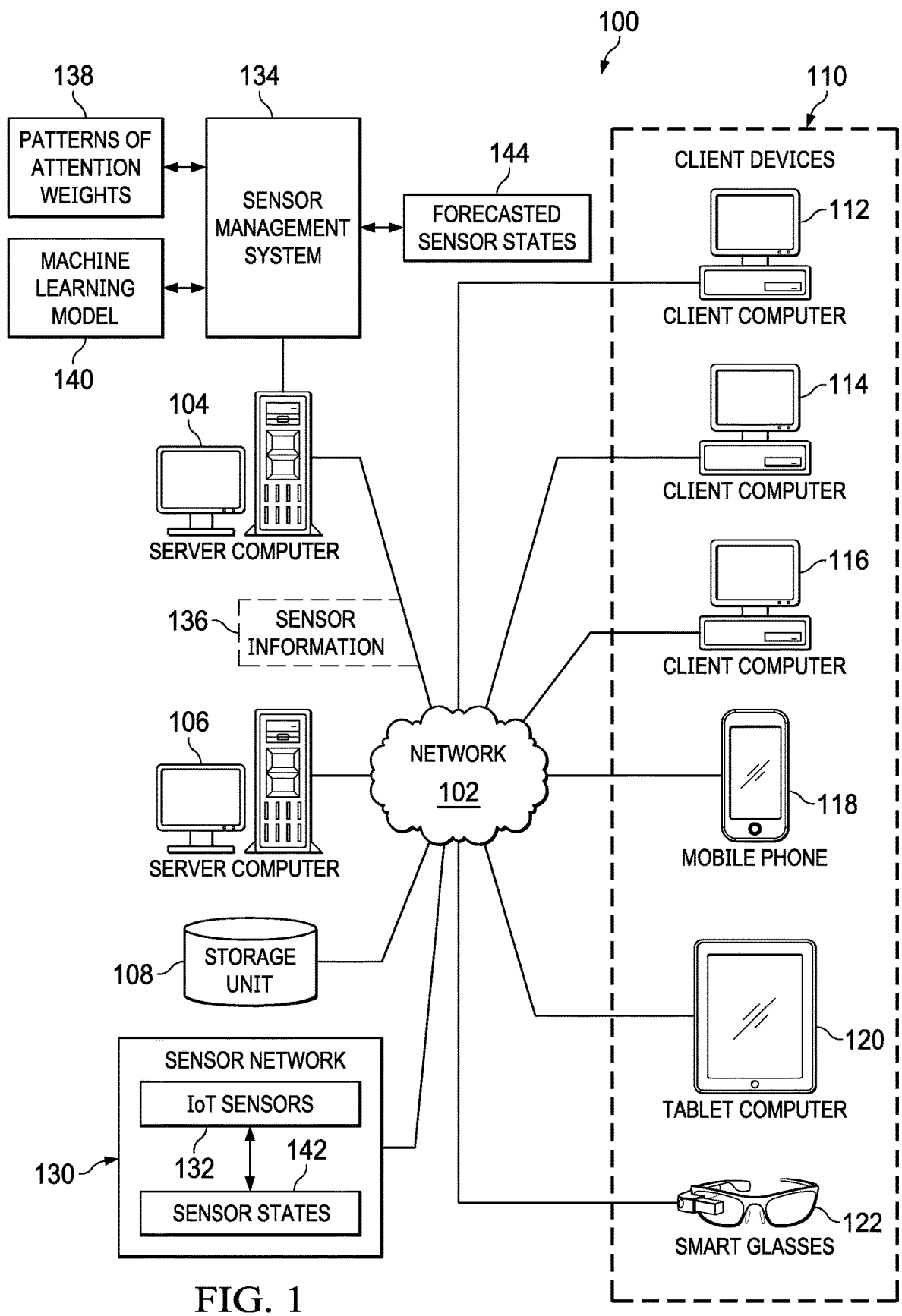
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different considerations. For example, the illustrative embodiments recognize and take into account existing power saving techniques do not consider dynamically tracking attention weights in a graph neural network for updating transition states for a sensor. The list embodiments recognize and take into account that attention weights can have patterns that indicate triggering a transition of a sensor state or group of sensor states and a sensor network. The illustrative embodiments recognize and take into account that identifying analyzing these patterns of attention weights triggering transition of sensor states can be used to enable increased power savings in a sensor network. The illustrative embodiments also recognize and take into account that current techniques do not take into account transition states for sensors that are strongly related to spatial events, tempo events, or both in an IoT sensor network.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program instructions located in network data processing system 100 can be stored on a computer-recordable storage media and downloaded to a data processing system or other device for use. For example, program instructions can be stored on a computer-recordable storage media on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, sensor network 130 containing Internet of Things (IoT) sensors 132 can be managed by sensor management system 134. As depicted, sensor management system 134 is located in server computer 104. Sensor management system 134 can operate to increase power savings in sensor network 130.

Sensor management system 134 can receive an input in the form of sensor information 136 for IoT sensors 132 in sensor network 130. In this illustrative example, sensor information 136 comprises sensor states information for IoT sensors 132 and can include other information relating to the environment, user interactions, or other information for IoT sensors 132.

In this illustrative example, sensor management system 134 can use sensor information 136 to discover patterns of attention weights 138. These patterns of attention weights can be patterns of attention weights 138 that trigger a change in the sensor state for a sensor or group of sensors in IoT sensors 132. As depicted, patterns of attention weights 138 be used to train machine learning model 140 to forecast sensor states 142 for a set of IoT sensors 132.

As used herein, a "set of" when used with reference items means one or more items. For example, a set of IoT sensors is one or more of IoT sensors 132.

In the illustrative example, sensor management system 134 can continuously capture or receive sensor information 136 for IoT sensors 132. With this continues receipt of sensor information 136, sensor management system 134 can continuously identify and update patterns of attention weights 138. In turn, with updated patterns, sensor management system 134 can continually train machine learning model 140 to more accurately forecast sensor states 142 for a set of IoT sensors 132.

In this illustrative example, machine learning model 140 outputs forecasted sensor states 144 for IoT sensors 132. Forecasted sensor states 144 are a forecast or prediction of sensor states 142 for IoT sensors 132. Forecasted sensor states 144 can be current sensor states for predicted future sensor states.

With the ability to forecast sensor states 142, sensor management system 134 can use this information to perform various actions that can improve power savings in sensor network 130. This information can also be used to prove other intents such as user experience, privacy, safety, or other purposes or goals. The improvement in power savings and sensor network 130 can be achieved by adjusting settings, rules, or other items in sensor network 130 using forecasted sensor states 144 for IoT sensors 132 generated by machine learning model 140.

Figure 2:
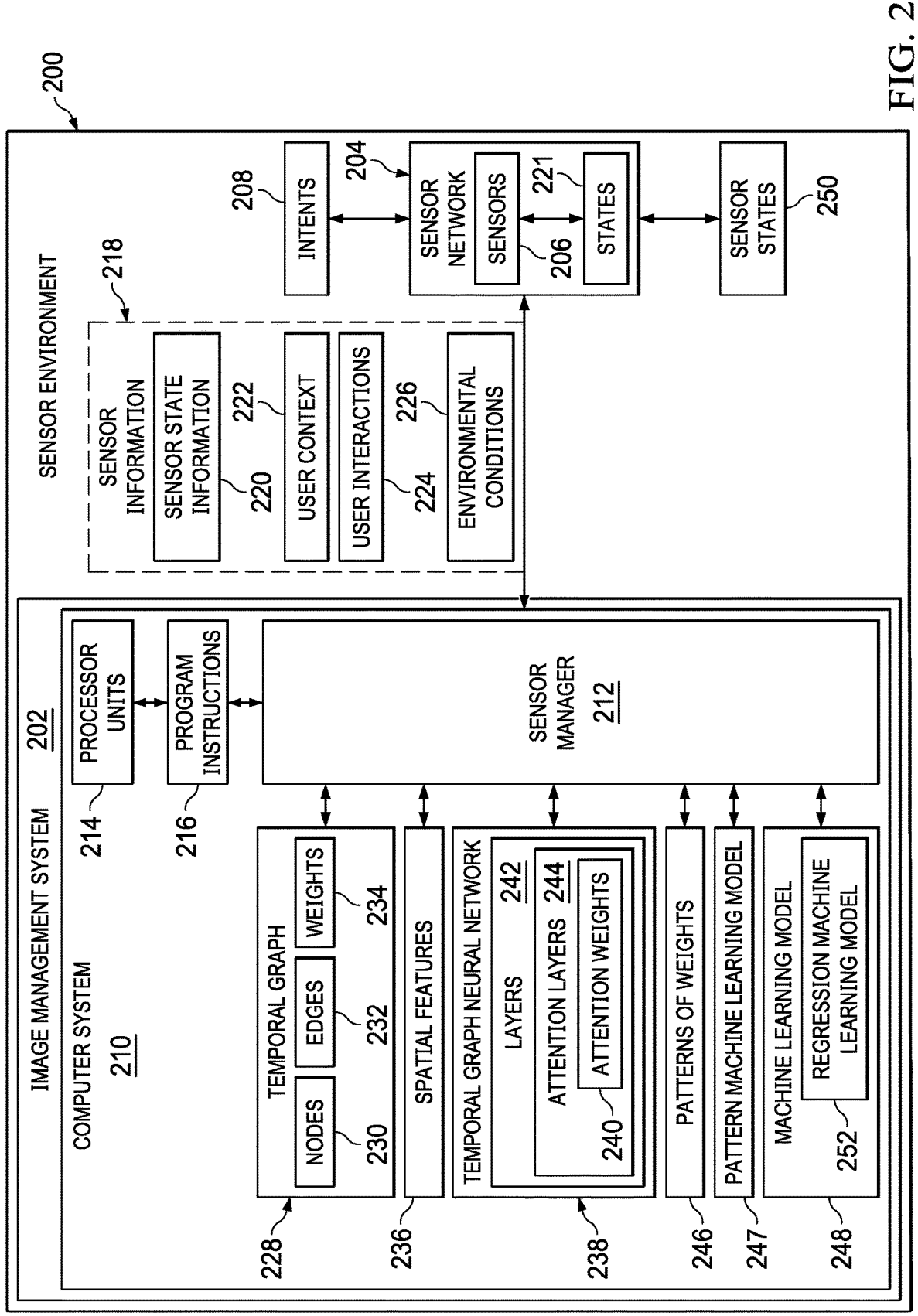
FIG. 2 is a block diagram of a sensor environment in accordance with an illustrative embodiment.

With reference now to FIG. 2, a block diagram of a sensor environment is depicted in accordance with an illustrative embodiment. In this illustrative example, sensor environment 200 includes components that can be implemented in hardware such as the hardware shown in network data processing system 100 in FIG. 1.

In this illustrative example, sensor management system 202 and sensor environment 200 can manage the operation of sensor network 204. In the illustrative example, sensor network 204 comprises sensors 206 in which sensors 206 can communicate with each other within sensor network 204. Sensors 206 can be comprised of at least one of an Internet of Things sensor, an Internet of Things device having a sensor, a microphone, a temperature sensor, a motion sensor, a light sensor, a thermostat, a smart speaker, a wireless access point, a smart watch, a mobile phone, or a smart thermostat.

Sensor management system 202 can adjust sensor network 204 to meet a set of intents 208. In this example, the set of intents 208 can be selected from at least one of power savings, user experience, user privacy, safety, or some other intent. An intent is a purpose or goal.

As depicted, sensor management system 202 includes computer system 210 and sensor manager 212. Sensor manager 212 is located in computer system 210. Sensor manager 212 can be implemented in software, hardware, firmware or a combination thereof. When software is used, the operations performed by sensor manager 212 can be implemented in program instructions configured to run on hardware, such as a processor unit. When firmware is used, the operations performed by sensor manager 212 can be implemented in program instructions and data and stored in persistent memory to run on a processor unit. When hardware is employed, the hardware can include circuits that operate to perform the operations in sensor manager 212.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 210 is a physical hardware system and includes one or more data processing systems. When more than one data processing system is present in computer system 210, those data processing systems are in communication with each other using a communications medium. The communications medium can be a network. The data processing systems can be selected from at least one of a computer, a server computer, a tablet computer, or some other suitable data processing system.

As depicted, computer system 210 includes a number of processor units 214 that are capable of executing program instructions 216 implementing processes in the illustrative examples. As used herein a processor unit in the number of processor units 214 is a hardware device and is comprised of hardware circuits such as those on an integrated circuit that respond and process instructions and program code that operate a computer. When a number of processor units 214 execute program instructions 216 for a process, the number of processor units 214 is one or more processor units that can be on the same computer or on different computers. In other words, the process can be distributed between processor units on the same or different computers in a computer system. Further, the number of processor units 214 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

In the illustrative example, sensor manager 212 can identify sensor information 218 about sensors 206 in sensor network 204. In this example, identification of sensor information 218 can be at least one of capturing or receiving sensor information 218. For example, sensor information 218 can be identified using a push or pull mechanism.

Sensor information 218 about sensors 206 can comprise sensor state information 220 over time. Sensor state information 220 can include states 221 and timestamps for states in sensors 206. These states can be, for example, awake, running, paused, stopped, suspend, long suspend, sleep, off, or some other state.

In the illustrative example, sensor state information 220 can also include information about transitions between states 221 for sensors 206. This information can include, for example, a transition from and "on" state to "sleep" state; a transition between a "suspend" state to an "off" state; or some other type of state transition. This information can also include timestamps so that the changes can be tracked temporally.

Further, in addition to sensor state information 220, sensor information 218 about sensors 206 can also comprise at least one of user context 222, user interactions 224, environmental conditions 226, or other information over time. This sensor information is track over time because the values for sensor information 218 can change over time.

In this illustrative example, user context 222 can be, for example, context about the use of a set of sensors 206 by users. For example, for example, a user context can be a conference in a meeting room in the set of sensors 206 can be sensors that detect motion or sound in the meeting room. A motion sensor for a light may be turned off during daylight hours to reduce power usage. With this example, user interactions 224 can be a user turning on the light during the day for a video conference even though it was determined that a light would not be needed during daylight hours. Environmental conditions 226 can be temperature, humidity, amount of light, or other environmental conditions in an area where sensors 206 are located.

With sensor information 218, sensor manager 212 can create temporal graph 228 of sensors 206 in sensor network 204 from sensor information 218 about sensors 206 in sensor network 204. In this depicted example, nodes 230 represent sensors 206 and edges 232 represent relationships between nodes 230 representing sensors 206. As depicted, edges 232 have weights 234. With this graph being a temporal graph, nodes and relationships between nodes can change over time.

In one illustrative example, an edge between two nodes can be a wireless connection. For example, the edge can be a Wi-Fi connection, a Bluetooth connection, a Zigbee connection, or some other type of wireless connection. The weight of this edge can be the strength of the signal for the wireless connection.

Wi-Fi is a trademark of the non-profit Wi-Fi Alliance. Bluetooth is a registered trademark of Bluetooth Special Interest Group (SIG), and Zigbee is a registered trademark of the ZigBee alliance.

Additionally, temporal graph 228 can also take into account spatial features 236 of sensors 206. For example, a spatial feature can include a position of a sensor. The position can include the location and three-dimensional space. This position can also include an orientation of the sensor.

With temporal graph 228, sensor manager 212 can create temporal graph neural network 238, which is a type of machine learning model. In this illustrative example, temporal graph neural network 238 can predict nodes and edges for a temporal graph representation of sensors 206 in sensor network 204. Additionally, temporal graph neural network 238 can also predict changes that occur over time.

Sensor manager 212 can train temporal graph neural network 238 using temporal graph 228 to predict attention weights 240 in weights 234 for temporal graph 228 of sensor network 204. In this example, at least one of a temporal graph reconstruction cost is reduced, a sensor state prediction cost is reduced, or a set of intents 208 is met for sensor network 204. In this illustrative example, temporal graph neural network 238 is a machine learning model that can predict nodes and edges for a temporal graph representation of sensors 206 in sensor network 204. Additionally, temporal graph neural network 238 can also predict changes that occur over time.

A machine learning model is a type of artificial intelligence model that can learn without being explicitly programmed. A machine learning model can learn based training data input into the machine learning model. The machine learning model can learn using various types of machine learning algorithms. The machine learning algorithms include at least one of a supervised learning, and unsupervised learning, a feature learning, a sparse dictionary learning, an anomaly detection, association rules, or other types of learning algorithms. Examples of machine learning models include an artificial neural network, a decision tree, a support vector machine, a Bayesian network, a genetic algorithm, and other types of models. These machine learning models can be trained using data and process additional data to provide a desired output.

In this illustrative example, within layers 242 in temporal graph neural network 238, a set of attention layers 244 are present. Attention weights 240 can be present in a set of attention layers 244.

Attention weights 240 are weights that can be assigned to edges 232 and temporal graph 228. Attention weights 240 can be used in temporal graph neural network 238 to determine suitable node and relationship or context in veterans by removing the noise of less useful relationship edges. In other words, attention weights 240 can indicate the relevancy of edges 232 with respect to corresponding nodes in temporal graph neural network 238 and can be used in predicting relationships between nodes 230.

Thus, each edge can have a learnable attention weight that is a function of the truthfulness or relevancy of the edge. The attention weight can also indicate the importance of a feature for a node representing a sense. Attention weights 240 can change over time and relationships between nodes 230 can be determined based on these changes in attention weights 240. With the use of one or more attention layers, importance to different sensor features can be learned by temporal graph neural network 238 in an unsupervised manner.

In the illustrative example, sensor manager 212 can determine patterns of weights 246 based on weights 234 and changes in weights 234 over time. These weights and the changes in weights over time can be attention weights 240. This determination can be performed in a number of different ways. A clustering or other pattern recognition technique can be used to determine patterns of weights 246. For example, pattern machine learning model 247 can be trained to identify patterns of weights. The training can be based on supervised or unsupervised learning in which a data set of weights having labels for patterns is used to train pattern machine learning model 247. In another illustrative example, a clustering or other pattern recognition technique can be used without employing machine learning model.

In this illustrative example, sensor manager 212 can train machine learning model 248 model using patterns of weights 246 to forecast sensor states 250 for sensors 206 in sensor network 204. In this illustrative example, machine learning model 248 can be regression machine learning model 252. Regression machine learning model 252 can be trained using a supervised learning technique that supports finding correlation among volumes. Regression machine learning model to solve a regression problem with the output variable is a real or continuous value. As a result, sensor manager 212 can forecast sensor states 250 in sensor network 204 using regression machine learning model 252 trained using patterns of weights 246.

With the ability to forecast sensor states 250 using regression machine learning model 252, sensor manager 212 can perform actions such as adjusting sensor network 204 to meet intents 208. For example, sensor network 204 can be adjusted to reduce power usage. The reduction in power usage can be enabled through adjusting when various sensors in sensor network 204 change states 221. These adjustments can be made by changing at least one of rules, settings, or other parameters for sensors 206 in sensor network 204.

In the illustrative example, sensor information 218 can be identified each time an event occurs. This event can be periodic or non-periodic event. As a result of continuing to receive sensor state information 220 over time, sensor manager 212 can update temporal graph 228 and in train temporal graph neural network 238 and in turn machine learning model 248 to more accurately forecast sensor states 250 with the use of additional training data obtained from receiving additional sensor state information over time.

In one illustrative example, one or more solutions are present that overcome a problems with reducing power usage or meeting other intents in sensor network 204. As a result, one or more solutions may provide more accurate predicting of sensor states 250 in a manner that enables making adjustments to sensor network to meet intents 208.

One or more illustrative examples identifies patterns of weights 246 for sensors 206 in sensor network 204. This mining of patterns of weights 246 can be performed using a temporal graph neural network created from sensor information from the sensor network of interest. As a result, temporal graph neural network can track changes in these attention weights over time. The temporal graph neural network 238 can also track spatial changes for sensors in sensor network 204.

With the patterns of weights 246 identified for sensor network 204, one or more illustrative examples can train machine learning model 248 to forecast or predict states 221 of sensors 206 in sensor network 204. With these forecasts, actions can be taken to increase power savings. For example, actions may be performed to initiate a state change in the sensor based on the prediction to increase power savings. These actions can be also performed for intense in addition to or in place of power savings. These other intents can include user experience, user privacy, user safety, or other types of intents.

Computer system 210 can be configured to perform at least one of the steps, operations, or actions described in the different illustrative examples using software, hardware, firmware or a combination thereof. As a result, computer system 210 operates as a special purpose computer system in which sensor manager 212 in computer system 210 enables more accurately forecasting sensor states for one or more sensors in a sensor network. In particular, sensor manager 212 transforms computer system 210 into a special purpose computer system as compared to currently available general computer systems that do not have sensor manager 212.

In the illustrative example, the use of sensor manager 212 in computer system 210 integrates processes into a practical application for managing a sensor network that increases the performance of computer system 210 in managing a sensor network. In other words, sensor manager 212 in computer system 210 is directed to a practical application of processes integrated into sensor manager 212 in computer system 210 that enables predicting sensor states in a sensor network with greater accuracy as compared to current techniques. In this illustrative example, sensor manager 212 in computer system 210 in improvement in managing a sensor network to meet desired purposes or goals such as power savings, user experience, user privacy, user safety, or other intents.

The illustration of sensor environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, one or more sensor networks may be present in addition to or in place of sensor network 204. Sensor manager 212 can create temporal graphs and train machine learning models to forecast sensor states in these sensor networks. Additionally, sensor manager 212 can repeatedly identify sensor state information 220 in response to events. These events can be periodic or nonperiodic events. Example, your argument can be a period of time such as one minute, 10 minutes, two days, or some other period of time. Nonperiodic event can be, for example, the addition of a sensor to sensor network 204, the removal of a sensor from sensor network 204, a user request to update temporal graph 228, or some other event. As another example, one or more sensor networks in addition to sensor network 204 can be present in sensor environment 200. Sensor manager 212 can operate to manage those sensor networks in addition to sensor network 204. In addition to different compositions, the other sensor networks may have different intents as compared to intents 208 for sensor network 204.

As a result, temporal graph 228 updated repeatedly over time with the update to temporal graph being used to train temporal graph neural network 238 to generate attention weights 240. Further, patterns of weights 246 can be re-identified and regression machine learning model 252 can be further trained to more accurately predict or forecast sensor states 250.

Figure 3:
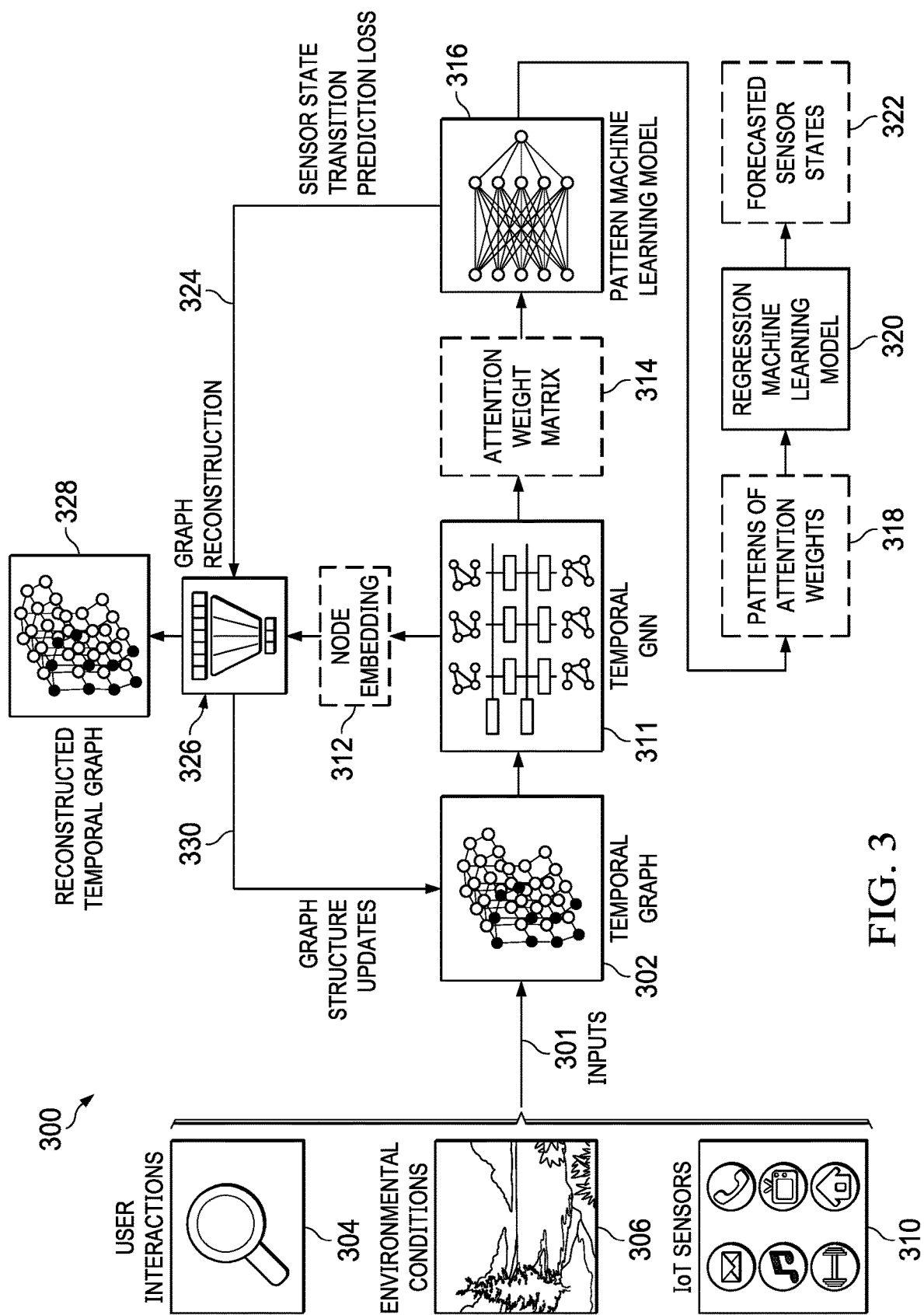
FIG. 3 is a dataflow diagram for forecasting sensor states in accordance with an illustrative embodiment.

Turning next to FIG. 3, a dataflow diagram for forecasting sensor states is depicted in accordance with an illustrative embodiment. In this depicted example, dataflow diagram 300 dataflow can occur in forecasting sensor states using sensor management system 202 in FIG. 2.

In this illustrative example, inputs 301 can be used to create temporal graph 302. In this illustrative example, inputs 301 include user interactions 304, environmental conditions 306, and IoT sensors 310. IoT sensors 310 can provide data such as states, transition times, signal strength, and other information. In this illustrative example, temporal graph 302 is graph of IoT sensors 310 created using real-world data for the sensors.

In this illustrative example, temporal graph 302 comprises nodes and edges. Nodes represent sensors and edges represent relationships between sensors. These relationships can include, for example, communications between sensors. The communications in the edges can be represented as, for example, a type communications link. These edges can have weights which can be, for example, signal strength, error, packed blocks, bandwidth, or other types of weights.

In this illustrative example, nodes and edges in temporal graph 302 can change over time. For example, the states of nodes can change over time. The weights of edges can change over time. Edges can be added or removed between nodes over time.

In this example, temporal graph 302 can be used to create temporal graph neural network (GNN) 311. Information from temporal graph 302 can be used to train temporal graph neural network 311. In the illustrative example, temporal graph neural network 311 has self-attention. In training temporal graph neural network 311 in the self-attention layer enables the inputs to interact with each other ("self") and identify which inputs should be paid more "attention".

In this illustrative example, temporal graph neural network 311 can output node embedding 312 and attention weight matrix 314. Node embedding 312 is a translation of information in higher dimensional space to a lower dimensional space. Node embedding 312 can enable discovery data in an efficient manner.

Attention weight matrix 314 is a data structure containing attention weights derived for at least one of nodes or edges in temporal graph 302 using temporal graph neural network 311. In other words, the attention weights in attention weight matrix can include weights for both nodes and edges. For example, the latent representation of a node captures the neighboring nodes and the edges for understanding the surrounding context. Similarly, the latent representation of the edge learns from the neighboring nodes and edges and captures the attention weight. In one example, two nodes such as the Wi-Fi sensor and the light sensor and edge connecting via these two sensors captures the relationship between Wi-Fi usage when there is a light on/off. The edge weight (attention) can change from timestamp t1 to t2 based on the surrounding context such as user presence in proximity of r radius.

Attention weight matrix 314 can be to train pattern machine learning model 316 to output patterns of attention weights 318. In this illustrative example, patterns of attention weights 318 is used as training data to train regression machine learning model 320 to forecast states for IoT sensors 310 and output this forecast as forecasted sensor states 322.

As a result, these forecasted sensor states can be used to perform actions such as changing rules, settings, or other parameters for IoT sensors 310 to achieve intents such as power savings, user experience, user privacy, user safety, and other types of goals or purposes. Additionally, these forecasted sensor states can also be used to adjust environmental conditions 306 in some cases. For example, cooling or heating can be provided for one or more of IoT sensors 310. In another example, one or more of IoT sensors 310 can be moved to different locations.

In this illustrative example, sensor state transition prediction loss 324 can be calculated for graph neural network parameters in temporal graph neural network 311. Sensor state transition prediction loss 324 is the distance or difference between forecasted sensor states 322 and the actual sensor states for IoT sensors 310. In this illustrative example, forecasted sensor states 322 can be for a set of sensors in IoT sensors 310. In other words, forecasted sensor states 322 can be for a portion of IoT sensors 310.

Further, node embedding 312 output by temporal graph neural network 311 can be used to perform graph reconstruction 326 to generate reconstructed temporal graph 328. Reconstructed temporal graph 328 can be compared to temporal graph 302. Graph structure updates 330 can be selectively made to temporal graph 302 taking into account sensor state transition prediction loss 324.

In this manner, improvements can be made to temporal graph 302 for use in further training or updating temporal graph neural network 311. In this manner, more accurate determinations of attention weights can be made increasing the accuracy in patterns of attention weights 318 used to train regression machine learning model 320. As a result, forecasted sensor states 322 can be improved based on this type of feedback. This feedback can be performed periodically or continuously depending on the particular implementation.

Figure 4:
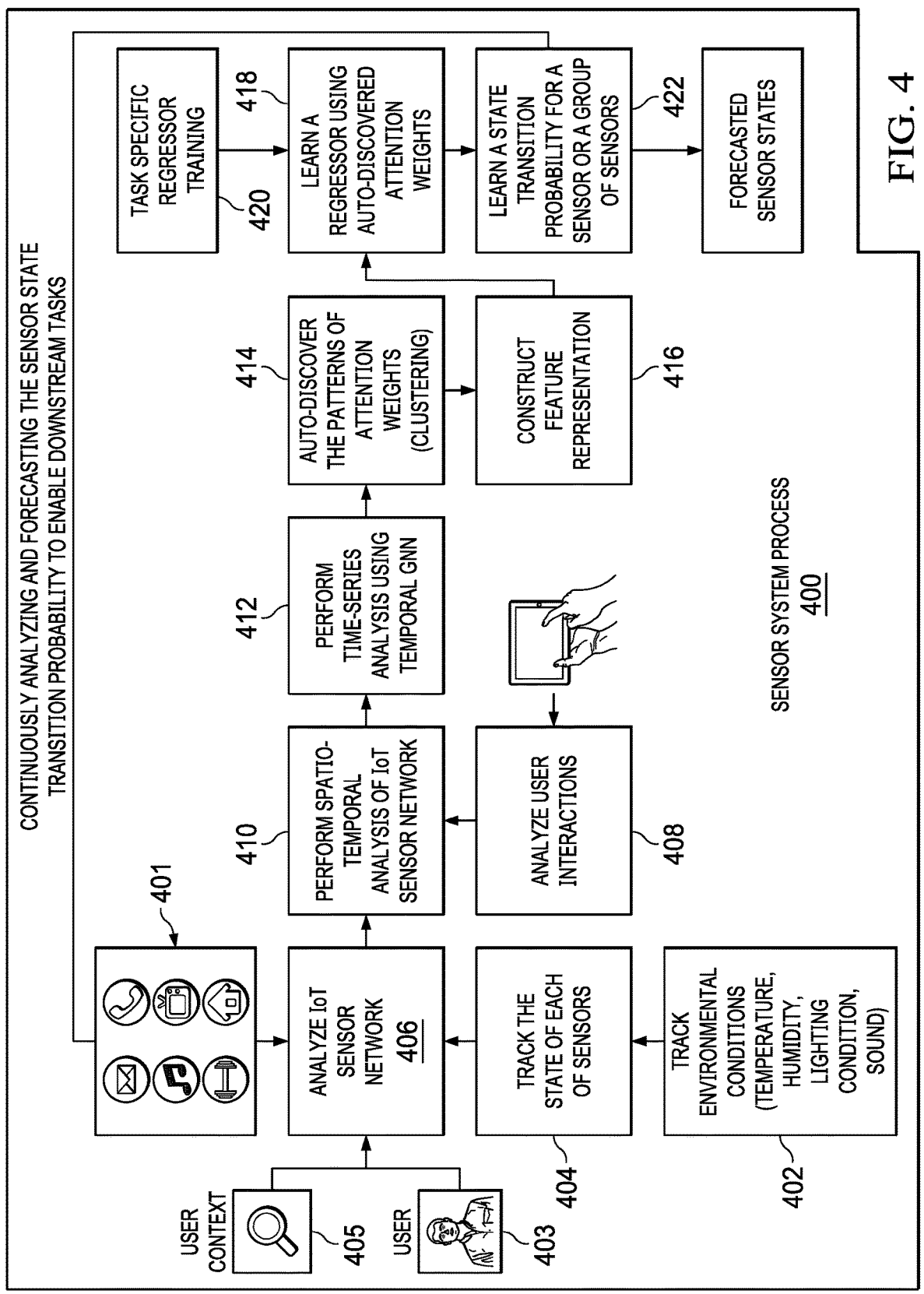
FIG. 4 is an illustration of a system process for forecasting states in a sensor network is debated in accordance an illustrative embodiment.

With reference to FIG. 4, an illustration of a sensor system process for forecasting states in a sensor network is debated in accordance an illustrative embodiment. As depicted, sensor system process 400 is an example of a process that can be implemented in sensor management system 202 in FIG. 2. In particular, this process can be implemented in program instructions 216 for sensor manager 212 in FIG. 2.

In this illustrative example, sensor system process 400 tracks environmental conditions (step 402). These environmental conditions can include, for example, temperature, humidity, lighting conditions, and sound. Sensor system process 400 also tracks the state of each of the sensor in IoT sensor network 401 (step 404). Sensor system process 400 analyzes IoT sensor network 401 (step 406). In step 406, a graph of IoT sensor network 401 is created. The graph can include the state the sensors tracked in step 404, environmental conditions tracked in step 402, user interactions 403, and user context 405.

Sensor system process 400 analyzes user interactions 403 (step 408). In step 408, the analysis of user interactions 403 can be used in determining changes to edges in the graph over time. Sensor system process 400 performs a spatio-temporal analysis of IoT sensor network 401 (step 410). In step 410, IoT sensor network 401 is analyzed over time to determine in at least one of nodes for sensors in the graph generated for IoT sensor network 401. This analysis includes determining sensor communication with other sensors. This communication is represented as edges in a temporal graph of IoT sensor network 401. This analysis can also include changes in the location of IoT sensors in IoT sensor network 401. The information from this analysis can be used to create a temporal graph neural network (GNN).

As depicted, sensor system process 400 performs a time series analysis using a temporal graph neural network (GNN) (step 412). In step 412, the analysis using the temporal graph neural network can identify how it is change over time. In other words, changes in attention weights can be determined using the temporal graph neural network and step 412. This analysis can result in output of an attention weight matrix that identifies the attention weights and how those attention weights change over time.

Sensor system process 400 auto discovers the patterns of attention weights (step 414). The identification of patterns of attention weights can be discovered using machine learning model trained using the attention weight matrix generated by the temporal graph neural network in step 412. These attention weights can change over time.

The machine learning model can employ a clustering technique to determine a pattern of attention weights. In other illustrative examples, the clustering analysis can be performed without a machine learning model. Further, the discovery of attention weights using machine learning model can be performed using supervised learning techniques or semi-supervised learning techniques.

Sensor system process 400 constructs a feature representation (step 416). In step 416, the feature representation is a concatenation of the dimensional weight matrix of a node for use in training a regress or machine learning model.

Sensor system process 400 performs machine learning for a regression machine learning model using the auto discovered attention weights (step 418). In this example, the feature representation of the weight. Further, sensor system process 400 uses task specific regressor training 420 (step 420) in step 418 in performing regressor training the regression machine learning model. The task specific regressor training can focus on intent such as energy-saving, improving user experience, user privacy, user safety, or other intents. Machine learning using a regression algorithm enables the regression machine learning model to learn relationships within the attention weights in the feature representation.

Sensor system process 400 then performs training to enable the regression machine learning model to determine state transition probability for a sensor or group of sensors in IoT sensor network 401 (step 422). With this training, the regression machine learning model can forecast states for IoT sensors in IoT sensor network 401. In step 422, the prediction of state transitions that are used to forecast the states. A group of sensors are represented by a group of nodes having similar spatio-temporal characteristics.

Sensor system process 400 can repeat these steps to improve the forecasting performed by the regression machine learning model. Further, by repeating the steps, sensor system process 400 can take into account changes that may occur within IoT sensor network 401. For example, IoT sensors may be added or removed from IoT sensor network 401 over time. As another example, communications between IoT in IoT sensor network 401 can also change over time.

Figure 5:
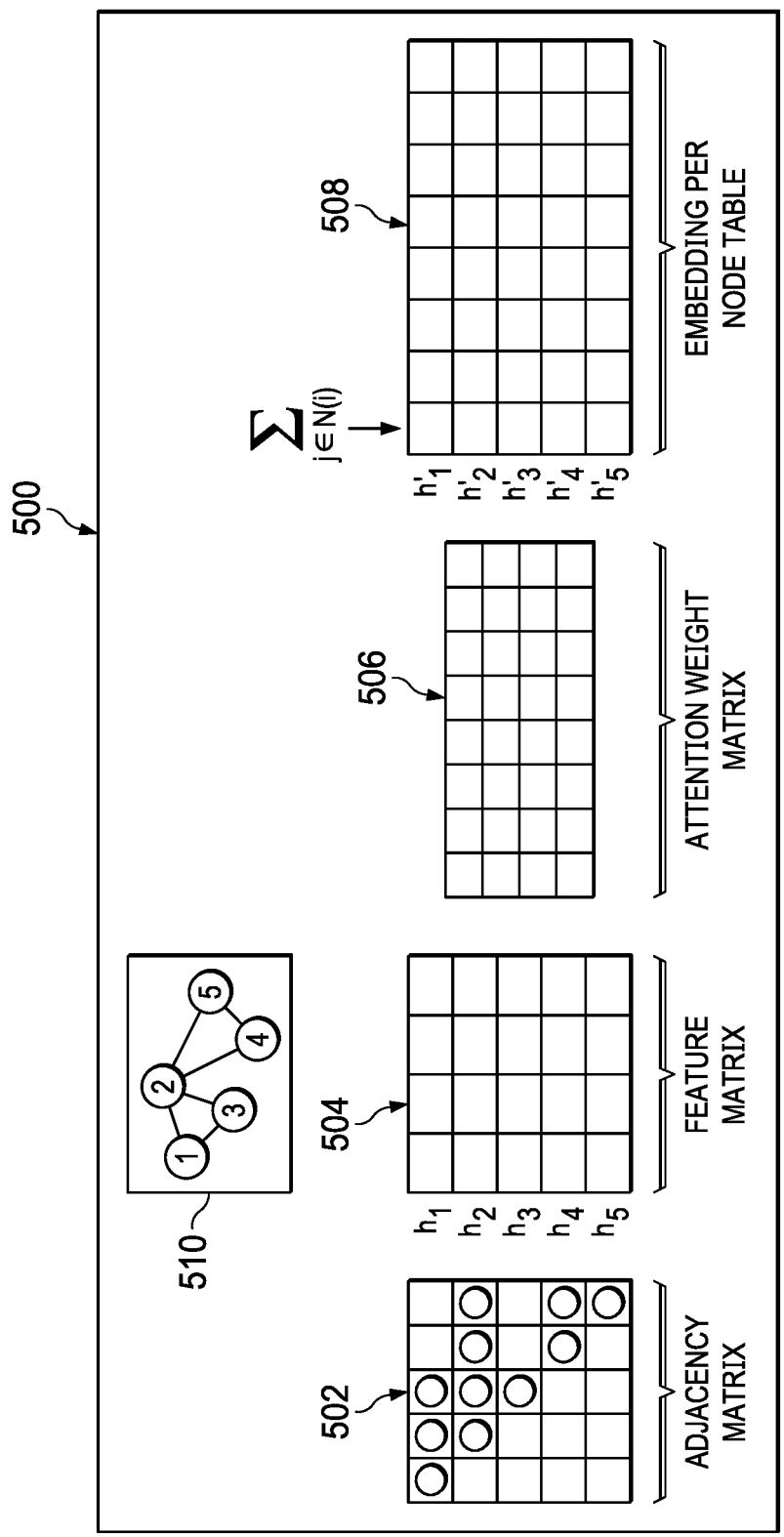
FIG. 5 is an illustration of data structures for a graph neural network in accordance with an illustrative embodiment.

Turning next to FIG. 5, data structures for a graph neural network are depicted in accordance with an illustrative embodiment. In this depicted example, data structures 500 are examples of data structures that can be used to train for temporal graph neural network such as temporal graph neural network 238 in FIG. 2. As depicted, data structures 500 comprise adjacency matrix 502, feature matrix 504, attention weight matrix 506, and embedding per node table 508 for sensor network 510.

As depicted in this figure, sensor network 510 includes five nodes connected by edges. The nodes can be representation of IoT devices and sensors that are connected to each other in a network. As shown in data structures 500, node 1 is connected to node 2 and node 3; node 2 is connected to node 1, node 3, node 4, and node 5; node 3 is connected to node 1 and node 2. Node 4 is connected to node 2 and node 5, and node 5 is connected to node 2 and node 5.

In this illustrative example, the interconnection of the five nodes in sensor network 510 can be represented in a data structure such as adjacency matrix 502 which is a 5×5 matrix. Adjacency matrix 502 is [(1,1,1,0,0), (1,1,1,1,1), (1,1,1,0,0), (0,1,0,1,1), (0,1,0,1,1)]. In this illustrative example, a "1" in the matrix represents a connection between two nodes and a "0" represents an absence of a connection between two nodes in sensor network 510.

Each node in the sensor network 510 can have features that are characteristics of the nodes. These characteristics can include the operation of the nodes.

The features in feature matrix 504 of comprises information about nodes in sensor network 510. Each row is for a node and each column represents a feature for a node. The features can be, for example, sensor state, sensor power consumption metric, historical sensor states in different timestamps, age of sensor, physical location of the sensor, or weather sensor is movable.

As depicted, the adjacency matrix 502 and features matrix 504 can be used as inputs to a temporal graph neural network. These inputs can cause the temporal graph neural network to output attention weight matrix 506 and embedding per node table 508.

In this illustrative example, the attention weight matrix 506 includes attention coefficients for edges between nodes. Edge between two nodes as an attention coefficient. The attention coefficient for the edges can be calculated as follows:

$$e_{ij}=a(Wh_i, Wh_j) \quad (1)$$

wherein the $e_{ij}$ is the calculated attention coefficient for the edge of node i and node j; a is a pre-defined attention coefficient function; W is a weight parameter for the edge between node i and node j; and $h_i$ and $h_j$ are the raw node features for node i and node j from the features matrix 504. In this example, $e_{ij}$ is a part of the adjacency matrix where an edge is between node i and the j node.

In this illustrative example, the calculated attention coefficient $e_{ij}$ for two given nodes can be normalized by calculating the fraction of exponential of attention coefficient of edge between node i and node j to a summation of exponential of attention coefficient of node i and each of the node i's neighboring nodes. The normalized attention coefficient $a_{ij}$ can be calculated using the following equation:

$$a_{ij} = softmax_j(e_{ij}) = \frac{\exp(e_{ij})}{\sum_{k \in N(i)} \exp(e_{ik})} = \frac{\exp(a((Wh_i, Wh_j)))}{\sum_{k \in N(i)} \exp(a((Wh_i, Wh_k)))} \quad (2)$$

wherein the $e_{ij}$ is the calculated attention coefficient for the edge of node 1 and node j; softmax is a normalized exponential function showing above; a is a pre-defined attention coefficient function; W is a weight parameter for the edge between node i and node j; $h_i$ and $h_j$ are the raw node features for node i and node j; using a softmax function takes as input a vector z of K real numbers, and normalizes this vector into a probability distribution consisting of K probabilities proportional to the exponentials of the input numbers. In this example, denominator captures the sum of all the of the attention weights of in the neighborhood of $i^{th}$ node and $a_{ij}$ represents the attention weight for the edge between $i^{th}$ node and the $j^{th}$ node.

In this illustrative example, a normalized attention coefficient is generated for each node against each of neighboring node for the node of interest. The normalized attention coefficients for each node can be combined to produce the attention weight matrix 506, where the rows of the matrix represent each node and the columns of the matrix represents the normalized attention coefficients.

The temporal graph neural network can also generate embeddings per node for embedding per node table 508. As depicted, the embedding method maps the information and variables from the nodes into a fixed length vector that captures the key features while reducing the dimensionality so that the connectivity and relationship between nodes can be studied by the machine learning model by just analyzing the mathematical representations of the nodes and the relationship between those nodes.

In other words, feature information can include redundant information in which information for a few features may be dominant or influence the state of sensors. In the illustrative example, these features can be identified and analyzed using the temporal graph neural network to output attention weights that can be analyzed to determine patterns of attention weights.

The embedding method extracts high-dimensional neighborhood vectors that contain information of proximity of a node to all other nodes and compress that vector into low-dimensional embedding. The extraction is performed for each node of interest. The nodes can be nodes from a monopartite graph. This type of graph includes nodes of same type or a multipartite graph, which includes nodes of different types.

As depicted, embedding per node table 508 has rows representing nodes and the columns represents the embeddings per node. In one example, the embedding for each node can be calculated by:

$$h'_i = \sigma\left(\sum_{j \in N(i)} W * h_j\right) \quad (3)$$

wherein the $h'_i$ is the calculated embedding for node i; σ represents is a transformation function learned as a part of machine learning model training; W is a weight parameter for the edge between node i and its connected neighboring nodes; and $h_j$ is the raw node features for node j. Node j is a connected neighboring node of node i.

In another example, the normalized attention coefficients can also be used to calculate embedding per node for embedding table per node table 508. The embedding per node with normalized attention coefficients can be calculated by:

$$h'_i = \sigma\left(\sum_{j \in N(i)} a_{ij} W * h_j\right) \quad (4)$$

wherein the $h'_i$ is the calculated embedding for node i; σ is a pre-defined constant; W is a weight parameter for the edge between node i and its connected neighboring nodes; $a_{ij}$ is the normalized attention coefficients for the edge between node i and node j; and $h_j$ is the raw node features for node j, which is a connected neighboring node of node i.

Figure 6:
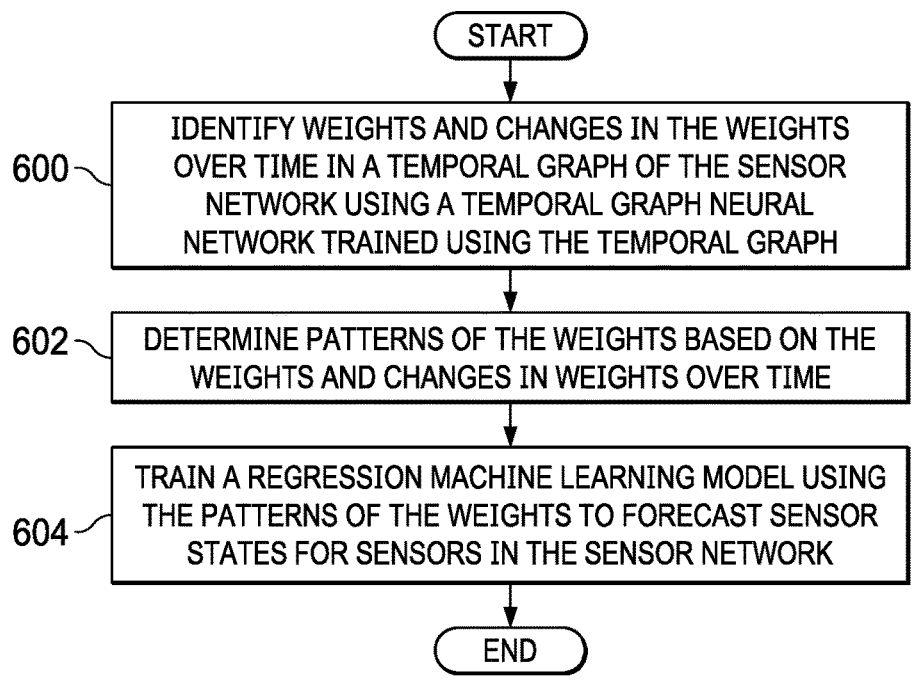
FIG. 6 is a flowchart of a process for forecasting sensor states in a sensor network in accordance with an illustrative embodiment.

Turning next to FIG. 6, a flowchart of a process for forecasting sensor states in a sensor network is depicted in accordance with an illustrative embodiment. The process in FIG. 6 can be implemented in hardware, software, or both. When implemented in software, the process can take the form of program instructions that is run by one of more processor units located in one or more hardware devices in one or more computer systems. For example, the process can be implemented in sensor manager 212 component in computer system 210 in FIG. 2.

The process begins by identifying weights and changes in the weights over time in a temporal graph of the sensor network using a temporal graph neural network trained using the temporal graph (step 600). In this illustrative example, wherein the weights are attention weights and a set of attention layers in the temporal graph neural network. The temporal graph can also have spatial features for the sensors.

The process determines patterns of the weights based on the weights and changes in weights over time (step 602). The process trains a regression machine learning model using the patterns of the weights to forecast sensor states for sensors in the sensor network (step 604). The process terminates thereafter.

Figure 7:
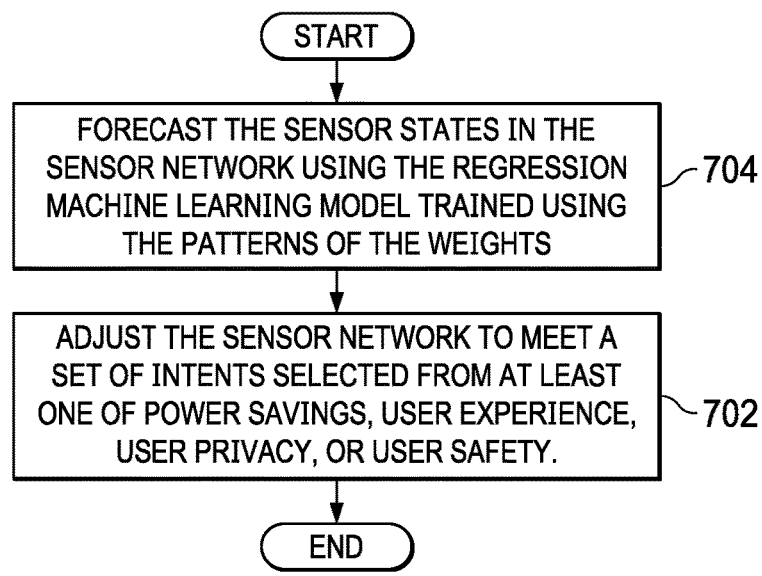
FIG. 7 is a flowchart of a process for forecasting sensor states in a sensor network in accordance with an illustrative embodiment.

With reference to FIG. 7, a flowchart of a process for forecasting sensor states in a sensor network is depicted in accordance with an illustrative embodiment. This flowchart depicts additional steps that can be performed in the flowchart in FIG. 6.

The process begins by forecasting the sensor states in the sensor network using the regression machine learning model trained using the patterns of the weights (step 700). The process adjusts the sensor network to meet a set of intents selected from at least one of power savings, user experience, user privacy, or user safety (step 702). The process terminates thereafter.

Figure 8:
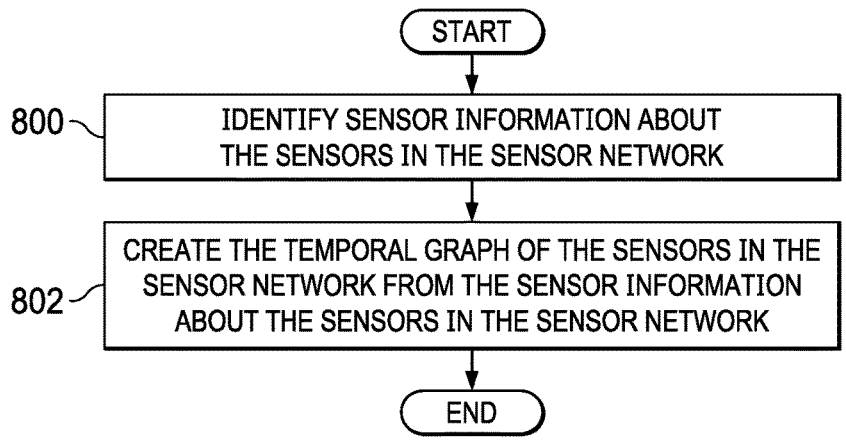
FIG. 8 is a flowchart of a process for creating a temporal graph for a sensor network in accordance with an illustrative embodiment.

Turning next to FIG. 8, a flowchart of a process for creating a temporal graph for a sensor network is depicted in accordance with an illustrative embodiment. This flowchart depicts additional steps that can be performed in the flowchart in FIG. 6.

The process begins by identifying sensor information about the sensors in the sensor network (step 800). The sensor information about the sensors comprises sensor state information and at least one of a user context, a user interaction, or an environmental condition over time.

The process creates the temporal graph of the sensors in the sensor network from the sensor information about the sensors in the sensor network (step 802). The process terminates thereafter. The nodes represent the sensors and edges represent relationships between the nodes representing the sensors in the temporal graph, wherein the edges have weights.

Figure 9:
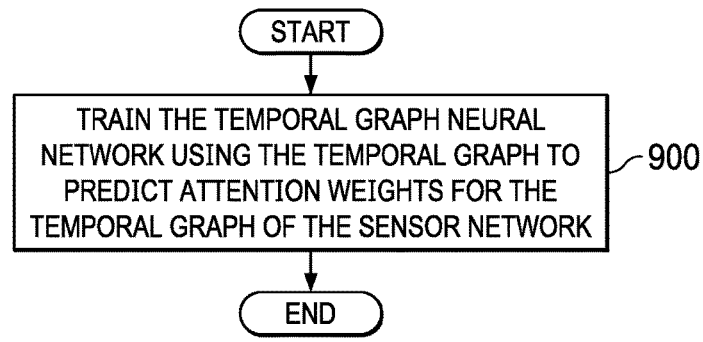
FIG. 9 is a flowchart of a process for training a machine learning model in accordance with an illustrative embodiment.

In FIG. 9, a flowchart of a process for training a machine learning model is depicted in accordance with an illustrative embodiment. This flowchart depicts an additional step that can be performed in the flowchart in FIG. 6 to train machine learning model in the form of a temporal graph neural network.

The process trains the temporal graph neural network using the temporal graph to predict attention weights for the temporal graph of the sensor network (step 900). In step 900, at least one of a temporal graph reconstruction cost is reduced, a sensor state prediction cost is reduced, or a set of intents is met for the sensor network in training the temporal graph neural network. In this illustrative example, the temporal graph neural network can output embedded nodes and attention weights in an attention weight matrix. Changes in the attention weights can also be identified using the attention weight matrix.

Figure 10:
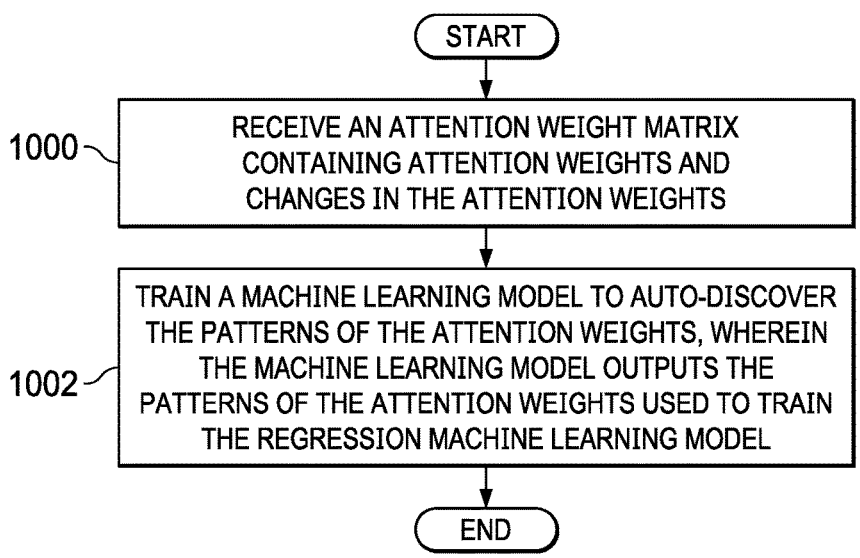
FIG. 10 is a flowchart of a process for determining patterns of weights in accordance with an illustrative embodiment.

Turning now to FIG. 10, a flowchart of a process for determining patterns of weights is depicted in accordance with an illustrative embodiment. The process in this flowchart is an example of an implementation for 602 in FIG. 6.

The process begins by receiving an attention weight matrix containing attention weights and changes in the attention weights (step 1000). The process trains a machine learning model to auto-discover the patterns of the attention weights, wherein the machine learning model outputs the patterns of the attention weights used to train the regression machine learning model (step 1002). The process terminates thereafter.

In other was to be examples, the patterns of attention weights can be determined using other techniques including algorithms pattern recognition or methods that do not employ machine learning model.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 11:
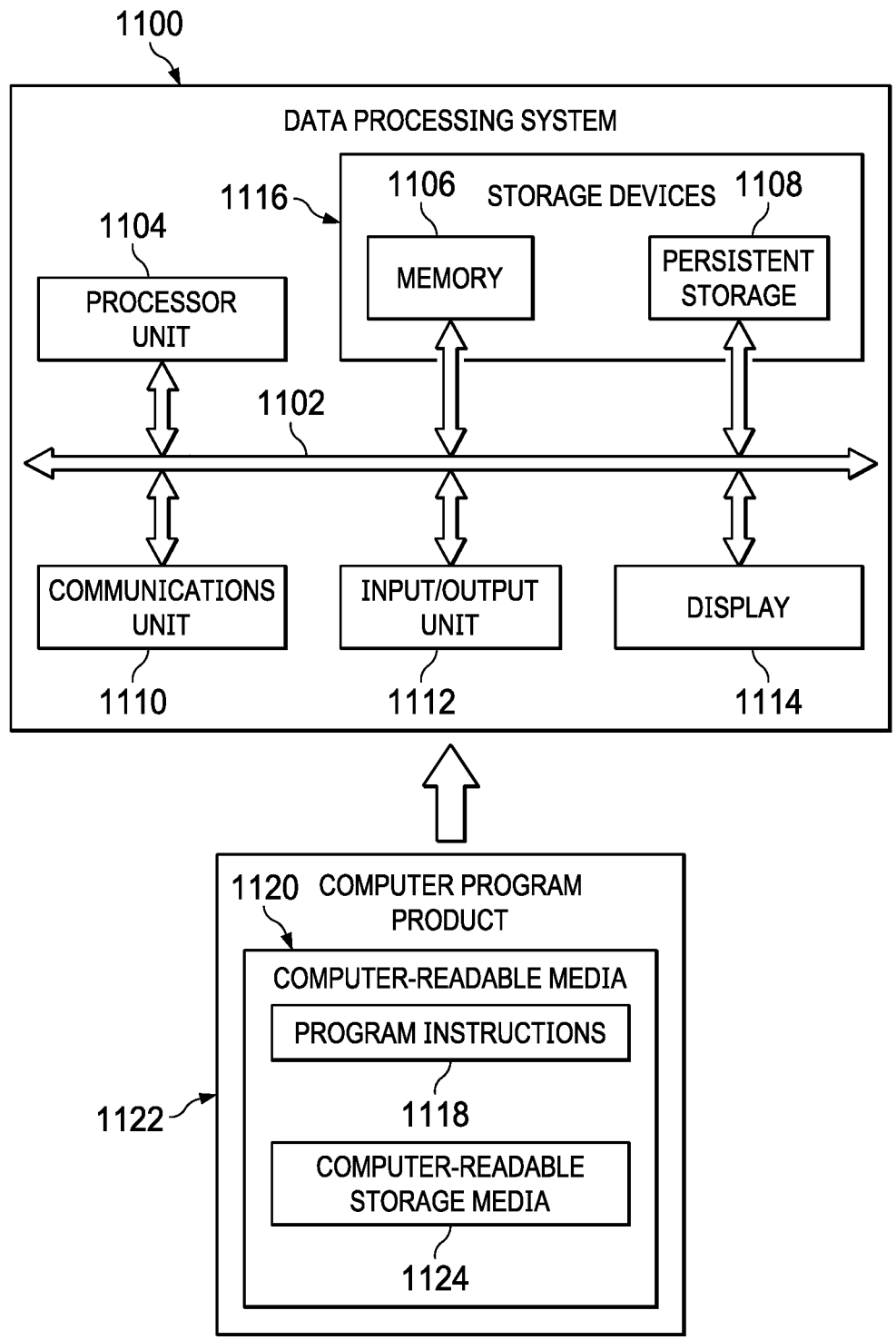
FIG. 11 is a block diagram of a data processing system in accordance with an illustrative embodiment.

Turning now to FIG. 11, a block diagram of a data processing system is depicted in accordance with an illustrative embodiment. Data processing system 1100 can be used to implement server computer 104, server computer 106, client devices 110, in FIG. 1. Data processing system 1100 can also be used to implement computer system 210 in FIG. 2. In this illustrative example, data processing system 1100 includes communications framework 1102, which provides communications between processor unit 1104, memory 1106, persistent storage 1108, communications unit 1110, input/output (I/O) unit 1112, and display 1114. In this example, communications framework 1102 takes the form of a bus system.

Processor unit 1104 serves to execute instructions for software that can be loaded into memory 1106. Processor unit 1104 includes one or more processors. For example, processor unit 1104 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1104 can may be implemented using one or more heterogeneous processor systems in which a main processor is present with secondary processors on a single chip. As another illustrative example, processor unit 1104 can be a symmetric multi-processor system containing multiple processors of the same type on a single chip.

Memory 1106 and persistent storage 1108 are examples of storage devices 1116. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1116 may also be referred to as computer-readable storage devices in these illustrative examples. Memory 1106, in these examples, can be, for example, a random-access memory or any other suitable volatile or non-volatile storage device. Persistent storage 1108 may take various forms, depending on the particular implementation.

For example, persistent storage 1108 may contain one or more components or devices. For example, persistent storage 1108 can be a hard drive, a solid-state drive (SSD), a flash memory, a rewritable optical disk, a rewritable magnetic tape, or some combination of the above. The media used by persistent storage 1108 also can be removable. For example, a removable hard drive can be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that can be connected to data processing system 1100. For example, input/output unit 1112 may provide a connection for user input through at least one of a keyboard, a mouse, or some other suitable input device. Further, input/output unit 1112 may send output to a printer. Display 1114 provides a mechanism to display information to a user.

Instructions for at least one of the operating system, applications, or programs can be located in storage devices 1116, which are in communication with processor unit 1104 through communications framework 1102. The processes of the different embodiments can be performed by processor unit 1104 using computer-implemented instructions, which may be located in a memory, such as memory 1106.

These instructions are referred to as program instructions, computer usable program instructions, or computer-readable program instructions that can be read and executed by a processor in processor unit 1104. The program instructions in the different embodiments can be embodied on different physical or computer-readable storage media, such as memory 1106 or persistent storage 1108.

Program instructions 1118 is located in a functional form on computer-readable media 1120 that is selectively removable and can be loaded onto or transferred to data processing system 1100 for execution by processor unit 1104. Program instructions 1118 and computer-readable media 1120 form computer program product 1122 in these illustrative examples. In the illustrative example, computer-readable media 1120 is computer-readable storage media 1124.

Computer-readable storage media 1124 is a physical or tangible storage device used to store program instructions 1118 rather than a medium that propagates or transmits program instructions 1118. Computer readable storage media 1124, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1118 can be transferred to data processing system 1100 using a computer-readable signal media. The computer-readable signal media are signals and can be, for example, a propagated data signal containing program instructions 1118. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1120" can be singular or plural. For example, program instructions 1118 can be located in computer-readable media 1120 in the form of a single storage device or system. In another example, program instructions 1118 can be located in computer-readable media 1120 that is distributed in multiple data processing systems. In other words, some instructions in program instructions 1118 can be located in one data processing system while other instructions in program instructions 1118 can be located in one data processing system. For example, a portion of program instructions 1118 can be located in computer-readable media 1120 in a server computer while another portion of program instructions 1118 can be located in computer-readable media 1120 located in a set of client computers.

The different components illustrated for data processing system 1100 are not meant to provide architectural limitations to the manner in which different embodiments can be implemented. In some illustrative examples, one or more of the components may be incorporated in or otherwise form a portion of, another component. For example, memory 1106, or portions thereof, may be incorporated in processor unit 1104 in some illustrative examples. The different illustrative embodiments can be implemented in a data processing system including components in addition to or in place of those illustrated for data processing system 1100. Other components shown in FIG. 11 can be varied from the illustrative examples shown. The different embodiments can be implemented using any hardware device or system capable of running program instructions 1118.

Thus, illustrative embodiments of the present invention provide a computer implemented method, computer system, and computer program product for forecasting sensor states in a sensor network are provided. A number of processor units identifies weights and changes in the weights over time in a temporal graph of the sensor network using a temporal graph neural network trained using the temporal graph. The number of processor units determines patterns of the weights based on the weights and changes in weights over time. The number of processor units trains a regression machine learning model using the patterns of the weights to forecast sensor states for sensors in the sensor network.

As a result, one or more illustrative examples identifies patterns of attention weights for sensors in a sensor network. This mining of patterns of attention weights can be performed using a temporal graph neural network created from sensor information from the sensor network of interests. The temporal graph neural network can track changes in these attention weights over time. The temporal graph neural network can also track spatial changes for sensors in the sensor network.

With the patterns of attention weights identified for the sensor network, one or more illustrative examples can train machine learning model to forecast or predict the status of sensors in the sensor network. With these predictions, actions can be taken to increase power savings. For example, actions may be performed to initiate a state change in the sensor based on the prediction to increase power savings. These actions can be also performed for intense in addition to or in place of power savings. These other intents can include user experience, user privacy, user safety, or other types of intents.

Thus, the illustrative examples can discover patterns of attention weights over time. The illustrative examples can also update the states of sensors based on discovering these patterns of attention weights using these patterns to train machine learning model to forecast sensor states in a manner that enables power saving. The illustrative examples also can use the forecasted states to trigger state changes of sensors to achieve desired goals including as power saving. In illustrative example, these attention weights can be tracked using a temporal graph neural network and the attention weights output by the temporal graph neural network can be used to train machine learning model to forecast states for sensors. These forecasted states can then be used to determine when and if transitions are needed for sensors to achieve desired goals or purposes.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for forecasting sensor states in a sensor network, the computer implemented method comprising:
   identifying, by a number of processor units, weights and changes in the weights over time in a temporal graph of the sensor network using a temporal graph neural network trained using the temporal graph;
   determining, by the number of processor units, patterns of the weights based on the weights and changes in the weights over time; and
   training, by the number of processor units, a regression machine learning model using the patterns of the weights to forecast sensor states for sensors in the sensor network.

2. The computer implemented method of claim 1 further comprising:
   forecasting, by the number of processor units, the sensor states in the sensor network using the regression machine learning model trained using the patterns of the weights, wherein the sensor states are power sensor states.

3. The computer implemented method of claim 2 further comprising:
   adjusting, by the number of processor units, the sensor network to increase power savings in the sensor network by adjusting when at least one sensor in the sensor network changes state.

4. The computer implemented method of claim 1, further comprising:
   training, by the number of processor units, the temporal graph neural network using the temporal graph to predict nodes and edges of the temporal graph.

5. The computer implemented method of claim 1 further comprising:
   identifying, by the number of processor units, sensor information about the sensors in the sensor network, wherein the sensor information about the sensors comprises sensor state information and at least one of a user context, a user interaction, or an environmental condition over time; and
   creating, by the number of processor units, the temporal graph of the sensors in the sensor network from the sensor information about the sensors in the sensor network, wherein nodes represent the sensors and edges represent relationships between the nodes representing the sensors in the temporal graph, wherein the edges have the weights.

6. The computer implemented method of claim 1 further comprising:
   training, by the number of processor units, the temporal graph neural network using the temporal graph to predict attention weights for the temporal graph of the sensor network.

7. The computer implemented method of claim 1, wherein the temporal graph includes spatial features for the sensors.

8. The computer implemented method of claim 1, wherein determining, by the number of processor units, the patterns of the weights based on the weights and changes in the weights over time comprises:
   receiving, by the number of processor units, an attention weight matrix containing attention weights and the changes in the attention weights; and
   training, by the number of processor units, a machine learning model to auto-discover the patterns of the attention weights, wherein the machine learning model outputs the patterns of the attention weights used to train the regression machine learning model.

9. A computer system comprising a number of processor units, wherein the number of processor units executes program instructions to:
   identify weights and changes in the weights over time in a temporal graph of a sensor network using a temporal graph neural network trained using the temporal graph;
   determine patterns of the weights based on the weights and changes in the weights over time; and
   train a regression machine learning model using the patterns of the weights to forecast sensor states for sensors in the sensor network.

10. The computer system of claim 9 further comprising:
    forecast the sensor states in the sensor network using the regression machine learning model trained using the patterns of the weights, wherein the sensor states are power sensor states.

11. The computer system of claim 10 further comprising:
    adjust the sensor network to increase power savings in the sensor network by adjusting when at least one sensor in the sensor network changes state.

12. The computer system of claim 9, further comprising:
    training, by the number of processor units, the temporal graph neural network using the temporal graph to predict nodes and edges of the temporal graph.

13. The computer system of claim 9 further comprising:
    identify sensor information about the sensors in the sensor network, wherein the sensor information about the sensors comprises sensor state information and at least one of a user context, a user interaction, or an environmental condition over time; and
    create the temporal graph of the sensors in the sensor network from the sensor information about the sensors in the sensor network, wherein nodes represent the sensors and edges represent relationships between the nodes representing the sensors in the temporal graph, wherein the edges have the weights.

14. The computer system of claim 9 further comprising:
    train temporal graph neural network using the temporal graph to predict attention weights for the temporal graph of the sensor network.

15. The computer system of claim 9, wherein the temporal graph also includes spatial features of the sensors.

16. The computer system of claim 9, wherein in determining the patterns of the weights based on the weights and changes in the weights over time, the number of processor units executes program instructions to:
receiving an attention weight matrix containing attention weights and the changes in the attention weights; and
training a machine learning model to auto-discover the patterns of the attention weights, wherein the machine learning model outputs the patterns of the attention weights used to train the regression machine learning model.

17. A computer program product for forecasting sensor states in a sensor network, computer program product comprising a computer readable storage medium having program instructions embodied therewith, the program instructions executable by a computer system to cause the computer system to perform a method of:
identifying, by a number of processor units, weights and changes in the weights over time in a temporal graph of the sensor network using a temporal graph neural network trained using the temporal graph;
determining, by the number of processor units, patterns of the weights based on the weights and the changes in the weights over time; and
training, by the number of processor units, a regression machine learning model using the patterns of the weights to forecast sensor states for the sensors in the sensor network.

18. The computer program product of claim 17 further comprising:
forecasting, by the number of processor units, the sensor states in the sensor network using the regression machine learning model trained using the patterns of the weights, wherein the sensor states are power sensor states.

19. The computer program product of claim 18 further comprising:
adjusting, by the number of processor units, the sensor network to increase power savings in the sensor network by adjusting when at least one sensor in the sensor network changes state.

20. The computer program product of claim 17 further comprising:
training, by the number of processor units, the temporal graph neural network using the temporal graph to predict attention weights for the temporal graph of the sensor network.

* * * * *